(12) United States Patent
Naserian et al.

(10) Patent No.: US 10,354,368 B2
(45) Date of Patent: Jul. 16, 2019

(54) APPARATUS AND METHOD FOR HYBRID GROUND CLEARANCE DETERMINATION

(71) Applicant: GM GLOBAL TECHNOLOGY OPERATIONS LLC, Detroit, MI (US)

(72) Inventors: Mohammad Naserian, Windsor (CA); Shuqing Zeng, Sterling Heights, MI (US); Allan Lewis, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 57 days.

(21) Appl. No.: 15/664,645

(22) Filed: Jul. 31, 2017

(65) Prior Publication Data

US 2019/0035057 A1 Jan. 31, 2019

(51) Int. Cl.
*G06T 5/00* (2006.01)

(52) U.S. Cl.
CPC .... *G06T 5/002* (2013.01); *G06T 2207/20084* (2013.01); *G06T 2207/30252* (2013.01)

(58) Field of Classification Search
CPC .......... G06T 5/002; G06T 2207/30252; G06T 2207/20084
See application file for complete search history.

(56) References Cited

U.S. PATENT DOCUMENTS

| 2007/0109177 | A1* | 5/2007 | Baath | G01S 13/38 342/124 |
| 2014/0218481 | A1* | 8/2014 | Hegemann | G01S 17/89 348/46 |
| 2015/0364041 | A1* | 12/2015 | Mohtashami | G08G 1/096783 702/166 |
| 2018/0081363 | A1* | 3/2018 | Qu | B64C 39/024 |
| 2018/0342160 | A1* | 11/2018 | Komori | G08G 1/166 |

* cited by examiner

*Primary Examiner* — Ming Y Hon

(57) ABSTRACT

A method and apparatus for determining ground clearance of a structure are provided. The method includes removing reflection points caused by noise from first reflection point information based on temporal persistency and generating second reflection point information, extracting visual features from an image of a camera based on convolutional neural network, projecting the second reflection point information onto the image, generating region proposals based on the projected second reflection point information and the image, the region proposals indicating potential horizontal structures above a path, detecting stationary horizontal structure above a path based on the generated region proposals, and determining distance between ground and the detected stationary horizontal structure based on the projected reflection point information and the image.

20 Claims, 4 Drawing Sheets

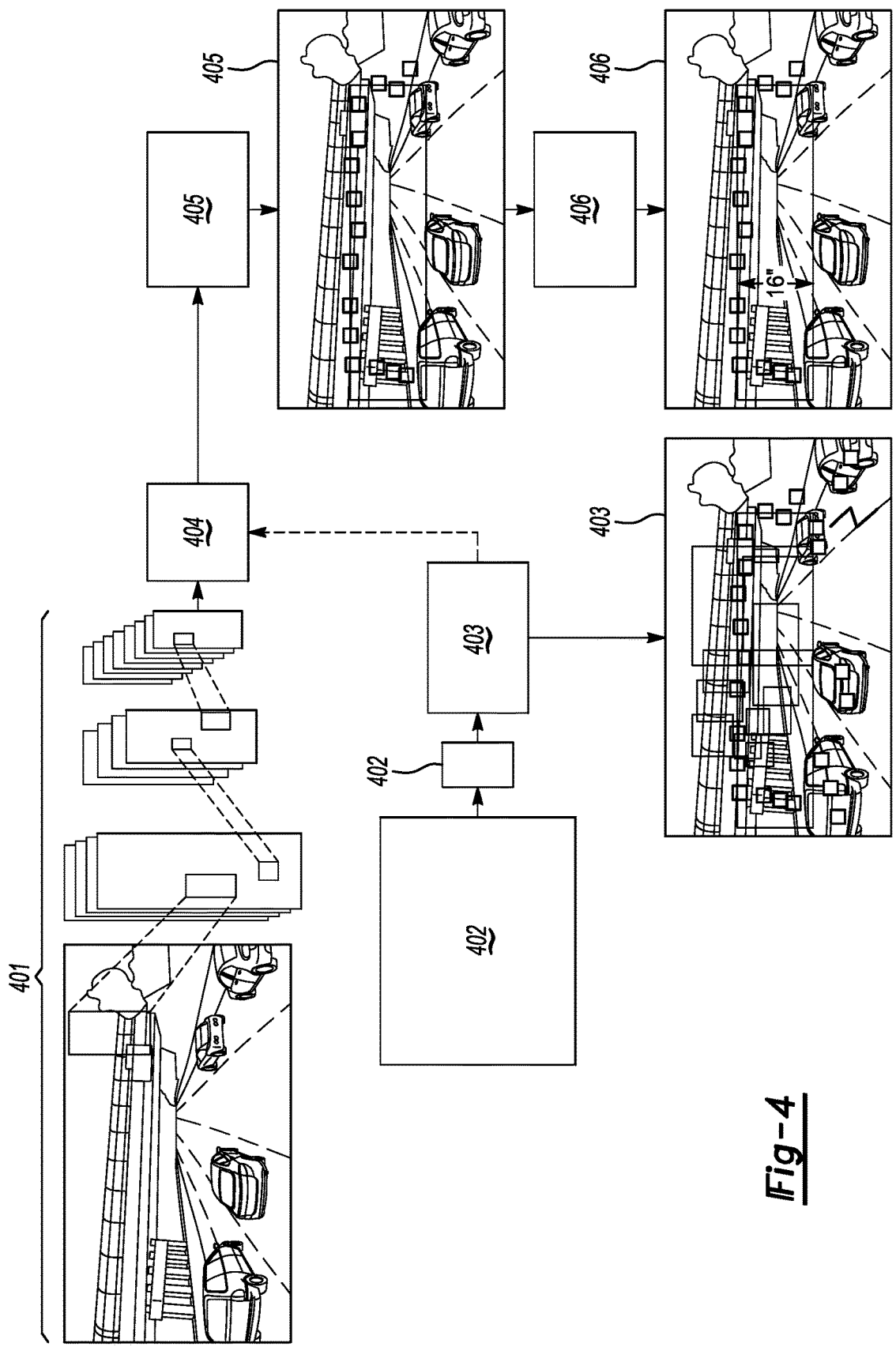

APPARATUS AND METHOD FOR HYBRID GROUND CLEARANCE DETERMINATION

INTRODUCTION

Apparatuses and methods consistent with exemplary embodiments relate to detecting the ground clearance of horizontal structures over a path of travel. More particularly, apparatuses and methods consistent with exemplary embodiments relate to detecting the ground clearance of horizontal structures over a path of travel and determining whether an object will pass through the determined ground clearance.

SUMMARY

One or more exemplary embodiments provide a method and an apparatus that detect the ground clearance of horizontal structures over a path of travel by using image information and radar information corresponding to the path. More particularly, one or more exemplary embodiments provide a method and an apparatus that may determine whether a vehicle may pass under a horizontal structure by correlating reflection point information from a long-range radar and image information from a camera.

According to an aspect of an exemplary embodiment, a method for determining ground clearance of a structure is provided. The method includes removing reflection points caused by noise from first reflection point information based on temporal persistency and generating second reflection point information, extracting visual features from an image of a camera based on convolutional neural network, projecting the second reflection point information onto the image, generating region proposals based on the projected second reflection point information and the image, the region proposals indicating potential horizontal structures above a path, detecting stationary horizontal structure above a path based on the generated region proposals, and determining distance between ground and the detected stationary horizontal structure based on the projected reflection point information and the image.

The method may further include receiving the first reflection point information from a radar configured emit radio waves at an area and generate the first reflection point information of the area based on the emitted radio waves and receiving the image from a camera configured to capture an image of the area.

The removing the reflection points may include determining whether a noisy reflection point is present a threshold number of times in reflection point information detected at a plurality of times and removing the noisy reflection point from the first reflection point information if the noisy reflection is not present in the reflection point information the threshold number of times.

The detecting the stationary horizontal structure above the path based on the generated region proposals may include discarding region proposals corresponding to moving objects from the generated region proposals.

The detecting the stationary horizontal structure above the path based on the generated region proposals may further include detecting the horizontal structure based on the dimensions of remaining generated region proposals other than the discarded region proposals.

The projecting the second reflection point information onto the image of the camera may include associating a location of the second reflection point information with a position on the image.

The extracting visual features from the image of the camera according to convolutional neural network may include applying a bank of kernels to the input image and determining a threshold for a convolution response output.

The method may further include receiving the image of the camera from a camera facing an area in front of a vehicle.

The method may further include receiving the first reflection point information from a long-range radar sensor.

According to an aspect of another exemplary embodiment, an apparatus for determining ground clearance of a structure is provided. The apparatus includes at least one memory including computer executable instructions; and at least one processor configured to read and execute the computer executable instructions. The computer executable instructions cause the at least one processor to remove reflection points caused by noise from first reflection point information based on temporal persistency and generate second reflection point information, extract visual features from an image of a camera based on a convolutional neural network, project the second reflection point information onto the image, generate region proposals based on the projected second reflection point information and the image, the region proposals indicating potential horizontal structures above a path, detect stationary horizontal structure above a path based on the generated region proposals, and determine distance between ground and the detected stationary horizontal structure based on the projected reflection point information and the image.

The apparatus may further include a long range radar configured emit radio waves at an area and generate the first reflection point information of the area based on the emitted radio waves, a camera configured to capture an image of the area, and the computer executable instructions may cause the at least one processor to receive the first reflection point information from the radar and receive the image from the camera.

The computer executable instructions may cause the at least one processor to remove the reflection points caused by noise by determining whether a noisy reflection point is present a threshold number of times in reflection point information detected at a plurality of times and removing the noisy reflection point from the first reflection point information if the noisy reflection is not present in the reflection point information the threshold number of times.

The computer executable instructions may cause the at least one processor to detect the stationary horizontal structure above the path based on the generated region proposals by discarding region proposals corresponding to moving objects from the generated region proposals.

The computer executable instructions may further cause the at least one processor to detect the stationary horizontal structure above the path based on the generated region proposals by detecting the horizontal structure based on dimensions of remaining generated region proposals other than the discarded region proposals.

The computer executable instructions may further cause the at least one processor to project the second reflection point information onto the image of the camera by associating a location of the second reflection point information with a position on the image.

The computer executable instructions may further cause the at least one processor to extract visual features from the image of the camera according to convolutional neural network by applying a bank of kernels to the input image and determining a threshold for a convolution response output.

The computer executable instructions may further cause the at least one processor to receive the image of the camera from a camera facing an area in front of a vehicle.

The computer executable instructions may further cause the at least one processor to receive the first reflection point information from a long-range radar sensor.

The computer executable instructions may further cause the at least one processor to extract visual features from the image of the camera according to convolutional neural network by applying a bank of kernels to the input image, determining a threshold for a convolution response output and scaling a feature map size.

Other objects, advantages and novel features of the exemplary embodiments will become more apparent from the following detailed description of exemplary embodiments and the accompanying drawings.

BRIEF DESCRIPTION OF THE DRAWINGS

FIG. 4 shows a flow diagram of ground clearance estimation according to an aspect of an exemplary embodiment.

DETAILED DESCRIPTION OF EXEMPLARY EMBODIMENTS

Figure 1:
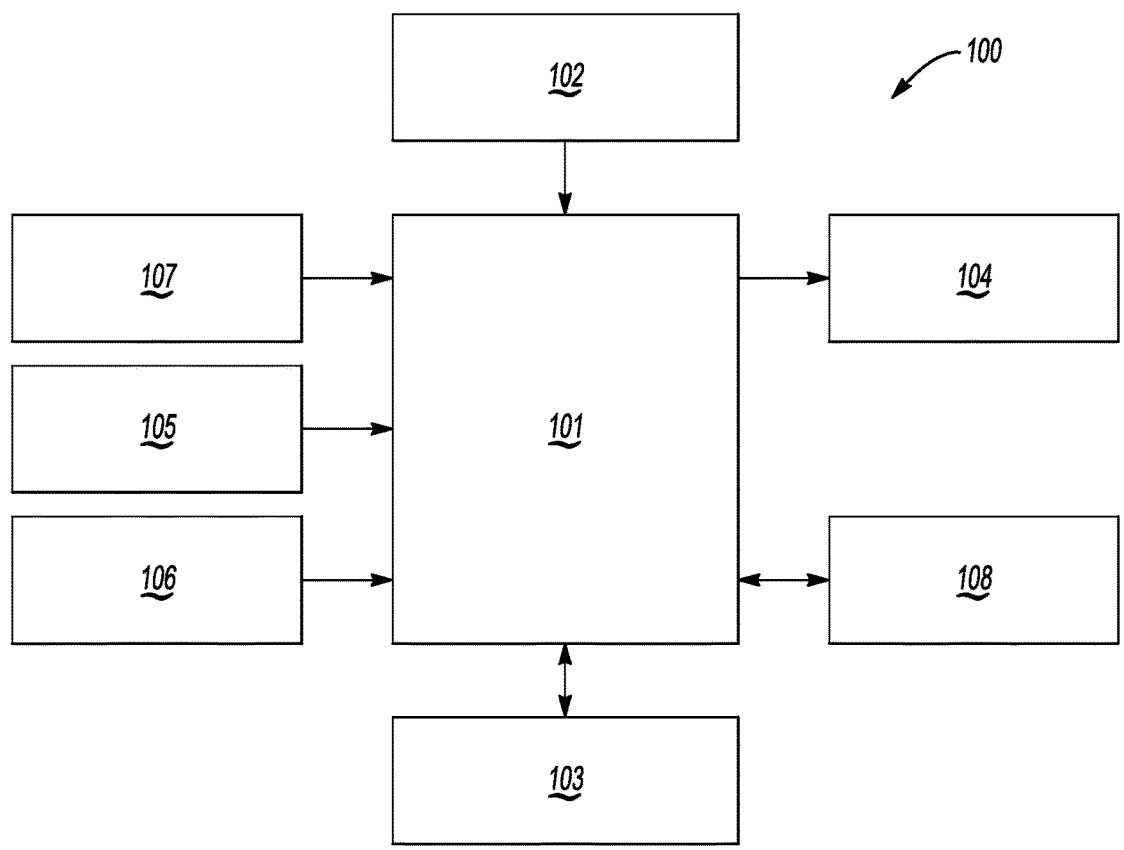
FIG. 1 shows a block diagram of an apparatus that determines the ground clearance of a structure according to an exemplary embodiment.

An apparatus and method that determine the ground clearance of a structure will now be described in detail with reference to FIGS. 1-4 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles such as trucks may sometimes pull trailers that are towable by the vehicle. Some trailers that may be towed by a vehicle include a fifth-wheel type, a gooseneck type, or a low-mount-coupler-type trailer. The vehicle may pull these trailers under horizontal structures as it passes under a bridge or highway overpass. Often times, the height of the trailer may be taller than the height of the vehicle. In addition, the ground clearance or distance between the ground and a horizontal structure running over a path of the vehicle may not be easily determined.

To address the above issue, operators of a vehicle may view information provided by one or more sensors. The sensors may include ultrasonic sensors, radar sensors and image sensors. The information from the sensors may indicate the ground clearance of a horizontal structure as well as the height of the vehicle and/or trailer. This information may be used to determine whether there is enough ground clearance under the horizontal structure, and to warn an operator in situation when a collision between a horizontal structure and the vehicle or trailer is possible.

FIG. 1 shows a block diagram of an apparatus for determining ground clearance of a structure 100 according to an exemplary embodiment. As shown in FIG. 1, the apparatus for determining ground clearance of a structure 100, according to an exemplary embodiment, includes a controller 101, a power supply 102, a storage 103, an output 104, a radar sensor 105, a user input 106, an image sensor 107, and a communication device 108. However, the apparatus for determining ground clearance of a structure 100 is not limited to the aforementioned configuration and may be configured to include additional elements and/or omit one or more of the aforementioned elements. The apparatus for determining ground clearance of a structure 100 may be implemented as part of a vehicle, as a standalone component, as a hybrid between an on vehicle and off vehicle device, or in another computing device.

The controller 101 controls the overall operation and function of the apparatus for determining ground clearance of a structure 100. The controller 101 may control one or more of a storage 103, an output 104, a radar sensor 105, a user input 106, an image sensor 107, and a communication device 108 of the apparatus for determining ground clearance of a structure 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the radar sensor 105, the user input 106, the image sensor 107, and the communication device 108 of the apparatus for determining ground clearance of a structure 100. The information may be sent and received via a bus or network, or may be directly read or written to/from one or more of the storage 103, the output 104, the radar sensor 105, the user input 106, the image sensor 107, and the communication device 108 of the apparatus for determining ground clearance of a structure 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the radar sensor 105, the user input 106, the image sensor 107, and the communication device 108, of the apparatus for determining ground clearance of a structure 100. The power supply 102 may include one or more from among a battery, an outlet, a capacitor, a solar energy cell, a generator, a wind energy device, an alternator, etc.

The storage 103 is configured for storing information and retrieving information used by the apparatus for determining ground clearance of a structure 100. The storage 103 may be controlled by the controller 101 to store and retrieve information received from the radar sensor 105 or the image sensor 107. The stored information may include image information captured by the image sensor 107 including information on visual features, objects, structures, object movement, etc. In addition, the stored information may also include information captured by the radar sensor 105 including reflection point information and corresponding timing information. Moreover, the stored information may also include convolutional neural networks used to identify objects, structures, visual features, etc. The storage 103 may also include the computer instructions configured to be executed by a processor to perform the functions of the apparatus for determining ground clearance of a structure 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus for determining ground clearance of a structure 100. The output 104 may include one or more from among a speaker, an audio device, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notification may indicate there is enough ground clearance for the vehicle or trailer or may indicate there is not enough clearance and warn of a potential collision between the horizontal structure and vehicle or trailer. In addition, the output 104 may output an image showing an area in front of vehicle including one or more of the visual features, the horizontal structure, the ground clearance, or the moving objects.

The radar sensor 105 is configured emit radio waves and to provide reflection point information and corresponding timing information. According to a first example, the radar sensor 105 may be a long-range radar sensor. The radar sensor 105 may include a transmitter or transmitting antenna configured to emit one or more from among radio waves, electromagnetic waves, and microwaves. The radar sensor 105 may also include a receiver or receiving antenna configured to receive the one or more from among radio waves, electromagnetic waves, and microwaves that reflect off an object or structure in a path in front of the radar sensor. In one example, the reflection point information may indicate the position of, the velocity of, or the distance to an object or structure.

The user input 106 is configured to provide information and commands to the apparatus for determining ground clearance of a structure 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to indicate a vehicle height, a trailer height, a required ground clearance. Moreover, the user input 106 may also be configured to receive an input activate or deactivate the apparatus for determining ground clearance of a structure 100.

The image sensor 107 may include one or more from among a plurality of sensors including an imaging sensor, a camera, an infrared camera, a video camera, and a LIDAR. The image sensor 107 may provide one or more images from one or more front-facing cameras or image sensors that may be analyzed to identify visual features, and determine which of the visual features correspond to a horizontal structure above a path in front of the image sensor 107.

In addition, other types of information such as infrared images, a distance to, a speed of, a velocity of, an acceleration of, a direction of travel of, or a dimension of, objects, structures, or vehicles may be provided by the radar sensor 105 or the image sensor 107, or other vehicle sensors. In one example, the focal length of a camera of the image sensor 107, edge and visual feature detection, and/or pixel coordinate and distance information may be used analyzed an image provided by image sensor 107 to determine dimensions and locations of objects, structures, etc. The dimensions and location of objects and structures in several images at several different times may be analyzed by the controller 101 to determine the other information types of information disclosed above.

The communication device 108 may be used by the apparatus for determining ground clearance of a structure 100 to communicate with various types of external apparatuses according to various communication methods. The communication device 108 may be used to send/receive information including reflection point information and timing information from the radar sensor 105, information from the image sensor 107 such as image information, and the other types of information.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as 3$^{rd}$ generation (3G), 3$^{rd}$ generation partnership project (3GPP), long-term evolution (LTE), Bluetooth, EVDO, CDMA, GPRS, EDGE or ZigBee.

According to an exemplary embodiment, the controller 101 of the apparatus for determining ground clearance of a structure 100 may be configured to remove reflection points caused by noise from first reflection point information based on temporal persistency and generate second reflection point information, extract visual features from an image of a camera based on a convolutional neural network, project the second reflection point information onto the image, generate region proposals based on the projected second reflection point information and the image, the region proposals indicating potential horizontal structures above a path, detect stationary horizontal structure above a path based on the generated region proposals, and determine distance between ground and the detected stationary horizontal structure based on the projected reflection point information and the image. The controller 101 of the apparatus for determining ground clearance of a structure 100 may also be configured to receive the first reflection point information from the radar, and receive the image from the camera.

The convolution operation may apply a bank of small (e.g., 3×3) kernels to an input image. A rectified linear unit (ReLU) may then apply a threshold to the convolution response output. A max-pooling operation may select the max value from a 2-by-2 template, while the feature map's size is scaled down by a factor of ½. The convolution neural network may generate a stack of feature map of different scales, the lower layer may have a small receptive field for detecting small objects and a higher layer may have a larger receptive field for detecting large object. A range map, e.g., a map projecting radar reflection points onto image plane, is concatenated with the visual feature maps.

The controller 101 of the apparatus for determining ground clearance of a structure 100 may be configured to remove the reflection points by determining whether a noisy reflection point is present a threshold number of times in reflection point information detected at a plurality of times, and removing the noisy reflection point from the first reflection point information if the noisy reflection is not present in the reflection point information the threshold number of times or for predetermine duration of time.

The controller 101 of the apparatus for determining ground clearance of a structure 100 may be configured to detect the stationary horizontal structure above the path based on the generated region proposals by discarding region proposals corresponding to moving objects from the generated region proposals.

The controller 101 of the apparatus for determining ground clearance of a structure 100 may be configured to detect the stationary horizontal structure above the path based on the generated region proposals by detecting the horizontal structure based on the dimensions of remaining generated region proposals other than the discarded region proposals.

The controller 101 may also be configured to project the second reflection point information onto the image of the camera by associating a location of the second reflection point information with a position on the image.

The controller 101 may also be configured to receive the image of the camera from a camera facing an area in front of a vehicle and to receive the first reflection point information from a long range radar sensor.

Figure 2:
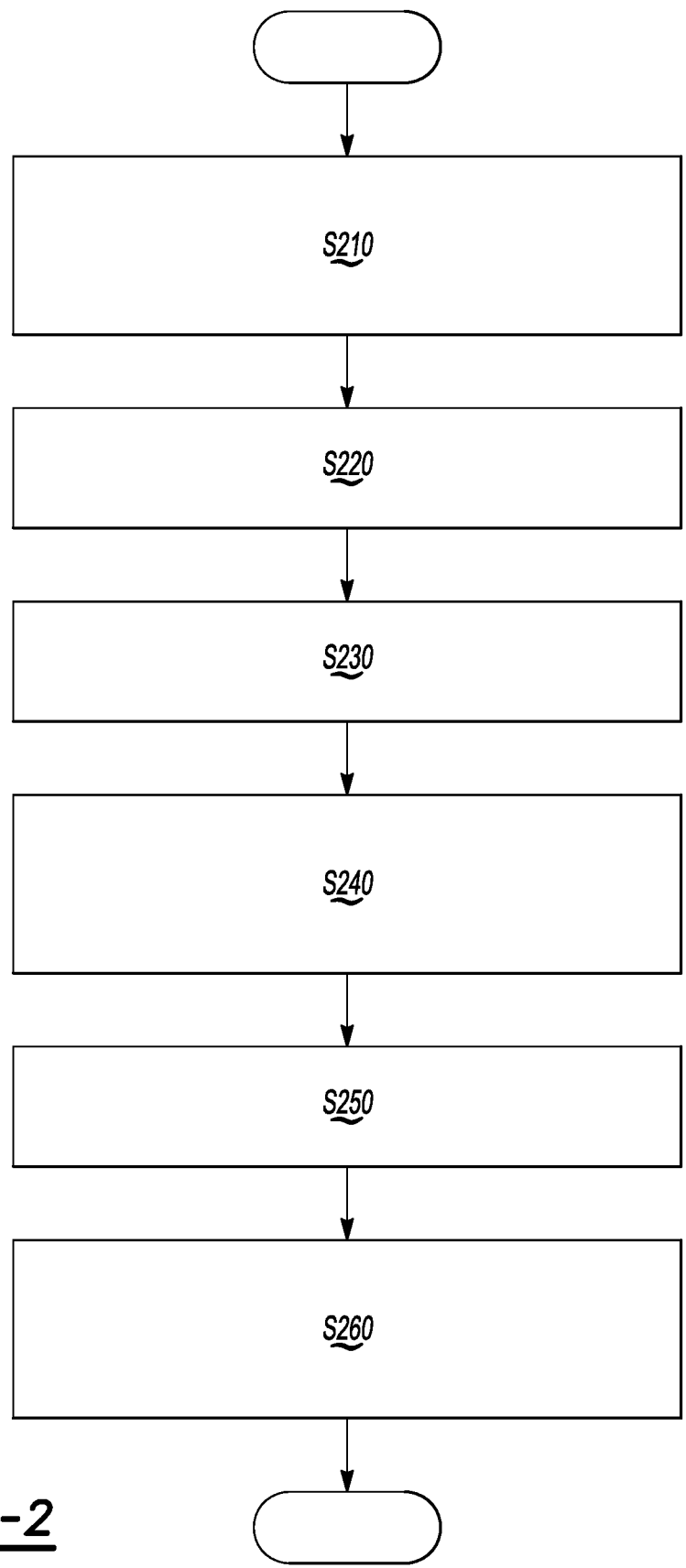
FIG. 2 shows a flowchart for a method of determining a ground clearance of a structure according to an exemplary embodiment.

FIG. 2 shows a flowchart for a method of trailer recognition according to an exemplary embodiment. The method of FIG. 2 may be performed by the apparatus for determining ground clearance of a structure 100 or may be encoded into a computer readable medium as instructions that are executable by a computer to perform the method.

Referring to FIG. 2, reflection points caused by noise are removed from first reflection point information based on temporal persistency and second reflection point information is generated in operation S210. In one example, the noisy reflection points are removed if the noisy reflection points are present in the reflection point information for a period of time that is less than a predetermined threshold time or if the noisy reflection points are present in a number of scans that is less than predetermined threshold number of scans of the radar.

In operation S220, visual features are extracted from an image taken by a camera. The visual features are extracted by using a convolutional neural network to identify the visual features to be extract. The second reflection point information is projected onto the image in operation S230. In one example, the second reflection point information is projected onto a position in the image corresponding to a real world position of the reflection point information.

Based on the projected second reflection point information and the image, region proposals indicating potential horizontal structures are generated in operation S240. In operation S250, a stationary horizontal structure above a path ahead of the camera is detected. Then, in operation S260, the distance between the ground and the detected stationary horizontal structure is determined based on projected reflection point information and image.

Figure 3:
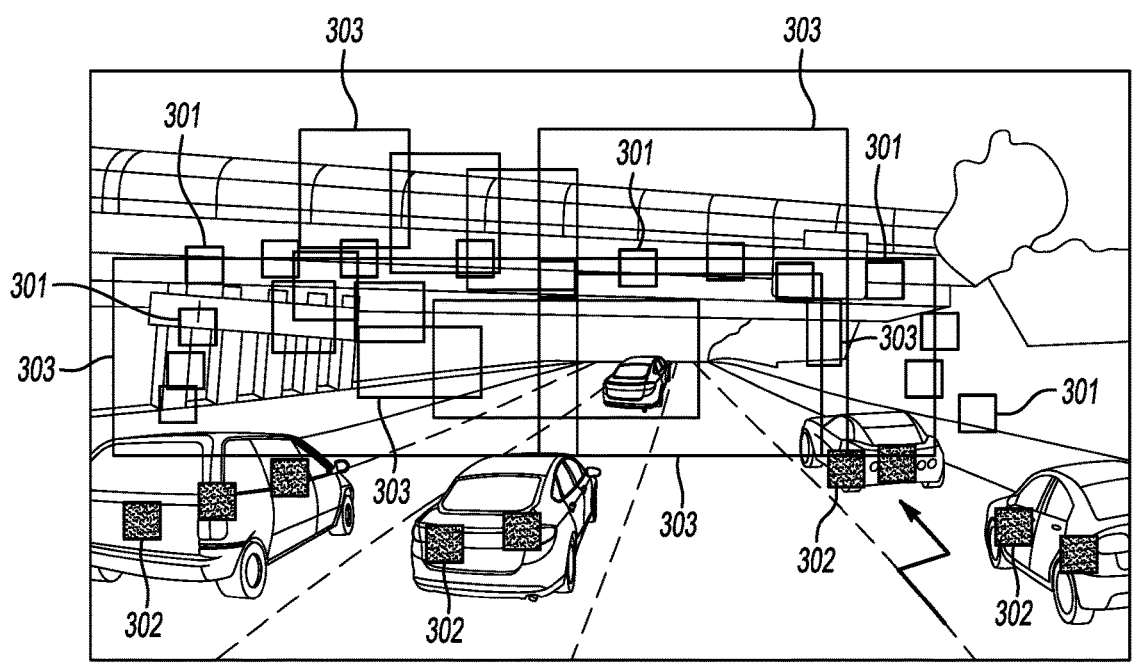
FIG. 3 shows an illustration of region proposals according to an aspect of an exemplary embodiment.

FIG. 3 shows an illustration of region proposals according to an aspect of an exemplary embodiment. Referring to FIG. 3, region proposals are illustrated by rectangles or outlines corresponding to visual features in the image.

Rectangles 301 correspond to detected horizontal stationary structure above the path in front of the camera. Rectangles 302 correspond to moving objects, which can be removed from the region proposals, as they do not correspond to a horizontal stationary structure above the path in front of the camera. Moreover, rectangles 303 correspond to all the visual features that may be detected in an image by using a convolutional neural network.

FIG. 4 shows a flow diagram of ground clearance estimation according to an aspect of an exemplary embodiment.

Referring to FIG. 4, visual feature maps 401 are generated from an image of a path in front of camera. A range map 402 determined from information provided by the radar or reflection point information is analyzed. Region proposals 403 are then generated based on range map 402. The region proposals may be detected by keeping cells with in the feature map that have the strongest local response and that correlate with the presence of radar reflection points. Region proposal pooling 404 is performed by using region proposals 403 and visual feature map 401.

Classification 405 of region proposals is performed using a convolutional neural network to detect a stationary horizontal structure. Then ground clearance estimation 406 is performed to detect a distance between the ground and the stationary horizontal structure.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for determining ground clearance of a structure, the method comprising:
   receiving first reflection point information from a radar configured emit radio waves at an area and generate the first reflection point information of the area based on the emitted radio waves;
   removing reflection points caused by noise from the first reflection point information based on temporal persistency;
   generating second reflection point information from the first reflection information and excluding removed reflection points;
   extracting visual features from an image of a camera based on convolutional neural network;
   projecting the second reflection point information onto the image;
   generating region proposals based on the projected second reflection point information and the image, the region proposals indicating potential horizontal structures above a path;
   detecting a stationary horizontal structure above the path based on the generated region proposals; and
   determining a distance between a ground and the detected stationary horizontal structure based on the projected reflection point information and the image.

2. The method of claim 1, further comprising:
   receiving the image from the camera configured to capture the image of the area.

3. The method of claim 1, wherein the removing the reflection points comprises:
   determining whether a noisy reflection point is present a threshold number of times in reflection point information detected at a plurality of times, and
   removing the noisy reflection point from the first reflection point information if the noisy reflection is not present in the reflection point information the threshold number of times.

4. The method of claim 1, wherein the detecting the stationary horizontal structure above the path based on the generated region proposals comprises discarding region proposals corresponding to moving objects from the generated region proposals.

5. The method of claim 4, wherein the detecting the stationary horizontal structure above the path based on the generated region proposals further comprises detecting the horizontal structure based on dimensions of remaining generated region proposals other than the discarded region proposals.

6. The method of claim 1, wherein the projecting the second reflection point information onto the image of the camera comprises associating a location of the second reflection point information with a position on the image.

7. The method of claim 1, wherein the extracting visual features from the image of the camera according to convolutional neural network comprises applying a bank of kernels to an input image and determining a threshold for a convolution response output.

8. The method of claim 1, further comprising receiving the image of the camera from the camera facing an area in front of a vehicle.

9. The method of claim 1, further comprising receiving the first reflection point information from a long-range radar sensor.

10. A non-transitory computer readable medium comprising instructions executable by a computer to perform the method of claim 1.

11. An apparatus that determines ground clearance of a structure, the apparatus comprising:
    on range radar configured emit radio waves at an area and generate first reflection point information of the area based on the emitted radio waves;
    at least one memory comprising computer executable instructions; and
    at least one processor configured to read and execute the computer executable instructions, the computer executable instructions causing the at least one processor to:
    remove reflection points caused by noise from the first reflection point information based on temporal persistency and generate second reflection point information;
    extract visual features from an image of a camera based on a convolutional neural network;
    project the second reflection point information onto the image;
    generate region proposals based on the projected second reflection point information and the image, the region proposals indicating potential horizontal structures above a path;
    detect a stationary horizontal structure above the path based on the generated region proposals; and
    determine a distance between a ground and the detected stationary horizontal structure based on the projected reflection point information and the image.

12. The apparatus of claim 11, further comprising:
    the camera configured to capture the image of the area, wherein the computer executable instructions cause the at least one processor to receive the first reflection point information from the radar, and receive the image from the camera.

13. The apparatus of claim 11, wherein the computer executable instructions cause the at least one processor to remove the reflection points caused by noise by:
    determining whether a noisy reflection point is present a threshold number of times in reflection point information detected at a plurality of times, and
    removing the noisy reflection point from the first reflection point information if the noisy reflection is not present in the reflection point information the threshold number of times.

14. The apparatus of claim 11, wherein the computer executable instructions cause the at least one processor to detect the stationary horizontal structure above the path based on the generated region proposals by discarding region proposals corresponding to moving objects from the generated region proposals.

15. The apparatus of claim 14, wherein the computer executable instructions further cause the at least one processor to detect the stationary horizontal structure above the path based on the generated region proposals by detecting the horizontal structure based on dimensions of remaining generated region proposals other than the discarded region proposals.

16. The apparatus of claim 11, wherein the computer executable instructions further cause the at least one processor to project the second reflection point information onto the image of the camera by associating a location of the second reflection point information with a position on the image.

17. The apparatus of claim 11, wherein the computer executable instructions cause the at least one processor to extract visual features from the image of the camera according to convolutional neural network by applying a bank of kernels to an input image and determining a threshold for a convolution response output.

18. The apparatus of claim 11, wherein the computer executable instructions cause the at least one processor to receive the image of the camera from the camera facing an area in front of a vehicle.

19. The apparatus of claim 11, wherein the computer executable instructions cause the at least one processor to receive the first reflection point information from a long-range radar sensor.

20. The apparatus of claim 11, wherein the computer executable instructions cause the at least one processor to extract visual features from the image of the camera according to convolutional neural network by applying a bank of kernels to an input image, determining a threshold for a convolution response output and scaling a feature map size.

* * * * *